United States Patent [19]

Uhle

[11] 4,346,642

[45] Aug. 31, 1982

[54] FASTENING DEVICE FOR EXTERNALLY COUPLING LOADS ON AIRCRAFT

[75] Inventor: Heiko Uhle, Egmating, Fed. Rep. of Germany

[73] Assignee: Messerschmitt-Bölkow-Blohm Gesellschaft mit beschränkter Haftung, Munich, Fed. Rep. of Germany

[21] Appl. No.: 133,479

[22] Filed: Mar. 24, 1980

[30] Foreign Application Priority Data

Mar. 24, 1979 [DE] Fed. Rep. of Germany ....... 2911603

[51] Int. Cl.³ .......................... B64D 1/04; F41F 5/02
[52] U.S. Cl. ................. 89/1.5 B; 89/1.5 G; 244/137 R
[58] Field of Search ............ 89/1.5 B, 1.5 G, 1.5 R, 89/1.5 E, 1.5 F; 244/137 R

[56] References Cited

U.S. PATENT DOCUMENTS 3,242,808 3/1966 Nelson et al. .............. 244/137 R X
3,670,620 6/1972 Paraskewik ..................... 89/1.5 B
3,840,201 10/1974 Hasquenoph et al. ........ 89/1.5 G X
4,122,754 10/1978 Panlaqui et al. ................. 89/1.5 B
4,168,046 9/1979 Hasquenoph et al. ........ 89/1.5 B X
4,196,879 4/1980 Craigie ......................... 89/1.5 B X
4,233,883 11/1980 Miko ............................. 89/1.5 B

FOREIGN PATENT DOCUMENTS 344891 11/1936 Italy ................................ 89/1.5 B
440156 12/1935 United Kingdom .............. 89/1.5 B Primary Examiner—David H. Brown
Attorney, Agent, or Firm—Toren, McGeady and Stanger

[57] ABSTRACT

A fastening device for externally coupling suspended loads on an aircraft having a pair of support arms pivotally mounted to a lifting device arranged therebetween for moving the support arms relative to a housing having abutments engaging the support arms so that by actuation of the lifting device the support arms are brought against the abutments and thereby urged into engagement with a load.

10 Claims, 4 Drawing Figures

U.S. Patent     Aug. 31, 1982     4,346,642
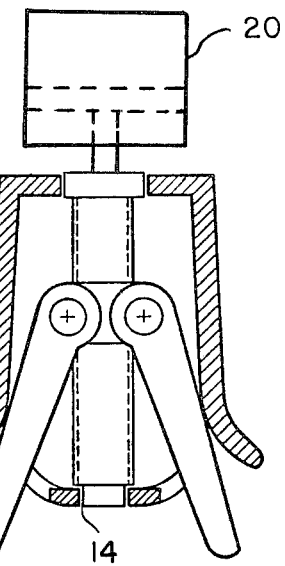
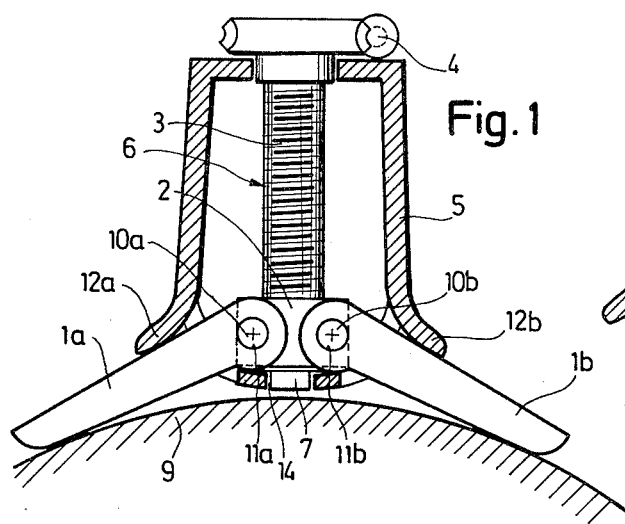
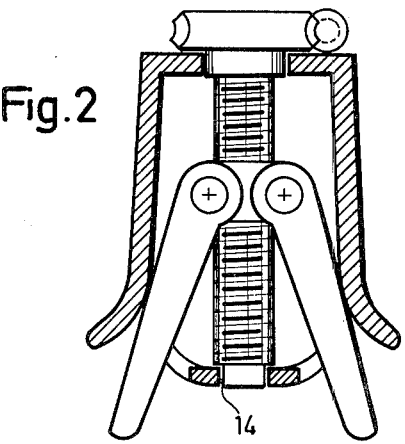
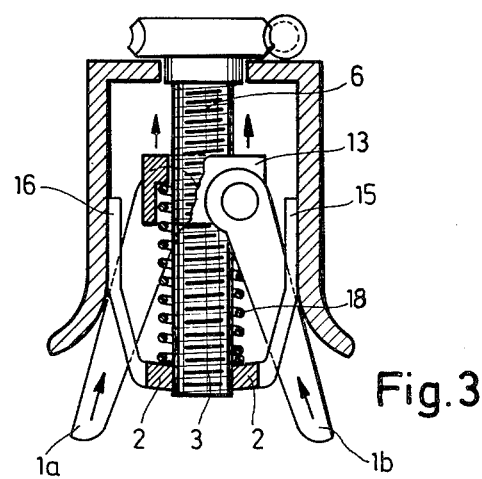

FASTENING DEVICE FOR EXTERNALLY COUPLING LOADS ON AIRCRAFT

The present invention relates generally to fastening devices and particularly to a device for engaging an external load on an aircraft, the load being suspended from suspension members such as eyes, hooks or the like.

Devices of the type mentioned above are required in order that an external load may be fastened on an aircraft so that the load may be released during flight of the aircraft in such a manner that harmful or undesirable effects, such as swinging of the load during flight, are avoided.

For this purpose, a load is usually provided with two suspension eyes arranged one behind the other in the direction of flight from which the load is suspended from the aircraft. In order to prevent swinging movement of the load, a known arrangement involves four tightening or clamping screws which are pressed in abutments against the load.

This known device involves cumbersome manual operation when the aircraft is on the ground, poor accessibility and the requirement that excessive time must be expended in its operation. Furthermore, such an arrangement exhibits unfavorable air resistance characteristics.

A further development known in the art which is described in German Offenlegungsschrift No. 2,804,856 is intended to simplify mounting of the load. In this case, two buffers or pads are spherically supported in an arm. Each arm is fastened to a frame in an articulated manner. In the interior of the frame there is provided a mechanism which presses a pin against the arms for fixing the load so that the arms are moved downwardly against the load. As a result, the buffers are pressed against the load in order to fix the load.

Compared to a conventional manner of fastening by means of tightening screws, this device offers some simplification in the manipulation thereof since imprecise and cumbersome tightening of screws is not required.

However, there still arises a disadvantage in that the arms, buffers and the like remain within the airflow path after release and therefore produce an unfavorable effect on the air resistance of the aircraft. Furthermore, it may occur that the arms will freely swing in the airflow and will lead to damage to the device.

Another serious problem arises in that for achieving simplification in the manipulation of the device, a complicated apparatus with an excessive number of mechanically moving parts is required. For example, slide levers, bolts with guides, springs, multiple housings and other similar elements are usually found necessary. Since a relatively large number of individual parts are required the entire device becomes rather expensive to produce.

Finally, in the case of loads having small outer diameters, an additional device must be provided in order to enable accomplishment of a secure fastening.

The present invention is directed toward providing a device which involves a simple mechanism and which allows a simple manual or central automatic fastening without requiring performance of changes in the standardized eyes of the external loads.

SUMMARY OF THE INVENTION

The present invention may be described as a fastening device for externally coupling suspended loads on aircraft comprising a pair of support arms, a lifting device arranged between the support arms and having the support arms fastened thereto in an articulated manner, and abutment means rigidly coupled with the aircraft, with the support arms being arranged to be actuated by the lifting device for abutment against the abutment means and for clamping against an external load.

The operation of the device is accomplished in that one or more pairs of the support arms fastened in an articulated manner to the lifting device arranged between the arms may be operated to effect a fastening operation by the support arms being clamped by the lifting device against the outside load and against the abutment means which is in rigid connection with the aircraft.

The invention provides a device which is distinguished by a minimum of mechanical parts and which involves less demanding requirements with regard to operation and maintenance. The parts which are exposed to the external air flow of the aircraft involve only small surface areas and the aerodynamic design of the support arms is a further advantage. After release of the load, the support arms may be retracted into a housing defining the abutment means so that air resistance generated by the device is minimized during further flight. Without additional measures, loads with very small diameters may be coupled with the aircraft and the device is equally suitable for utilization in high performance aircraft as well as in slow flying helicopters.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the drawings:

FIG. 1 is a sectional view showing a device in accordance with the present invention with an outside load fastened by means of the device;

FIG. 2 is a sectional view showing the support arms of the invention which are retracted half way after the outside load has been released; and FIG. 3 is a sectional view showing an embodiment of the invention having automatically retractable support arms and FIG. 4 is a sectional view showing another embodiment of the invention.

DETAILED DESCRIPTION OF THE PREFERRED EMBODIMENTS

Referring now to the drawings, wherein similar reference numerals are used to refer to similar parts throughout the various figures thereof, a device in accordance with the present invention is depicted in FIG. 1 which consists essentially of a pair of support arms 1a and 1b with a lifting device 6 composed of a nut 2 with a spindle 3 being provided within a housing 5. A worm drive 4 is arranged above the housing 5, as seen in FIG. 1. An outside load is suspended in a known manner by means of eyes, hooks or the like (not shown in detail) from the lifting device and the spindle 3 is at its lower end guided within a bore 14 in the housing 5.

The support arms 1a, 1b are attached in an articulated manner to a nut 2. For this purpose there are provided pins or bolts 10a, 10b on the nut 2 onto which the support arms 1a, 1b are fitted through bores 11a and 11b. Each of the support arms 1a, 1b may have a forked configuration at the upper ends thereof and they may be supported on a pin 10a, 10b of the nut 2 (see also FIG. 3) so that a symmetrical application of the load on the nut results.

The housing 5 serves to define abutments 12a, 12b and for receiving the lifting device 6 and the worm drive 4. The housing 5 itself may be an integral component of the aircraft (not shown) and the housing 5 may have any optional configuration except that in the region of the abutments 12a, 12b there must be provided an appropriate shape.

In order to fasten an outside load 9, the nut 2 is initially moved toward the bottom end of the spindle 3. The support arms 1a, 1b hang loosely or are spread apart by means of the force of a spring. An outside load 9 is suspended from a hook by means of its eye (not shown) and in so doing the support arms are moved downwardly and spread apart. By raising of the nut 2 by actuation of the spindle 3, the support arms 1a and 1b are pulled into the housing 5 and are clamped against the abutments 12, 12b and the outside load so that the load is fastened on the aircraft.

Operation of the lifting device 6 may be manually performed. However, the device is also especially suitable for automatic operation and the worm drive 4 may be driven by means of an electric motor. Also, the lifting device 6 may be constructed as a mechanism 20 shown in FIG. 4 which may comprise a hydraulic or pheumatic device. In the latter case, for example, the support arms 1a, 1b may be hinged in a manner not illustrated to a piston rod of an appropriate actuating cylinder. In each of these cases it is advantageous to construct a lifting device 6 so as to be self-locking or irreversible.

FIG. 2 depicts the support arms 1a, 1b in an intermediate position during retraction after the outside load has been removed. Release may be performed in a known manner by swinging out load hooks, by a pyrotechnical separation or the like and is not the subject of the present invention.

When an outside load 9 is attached, the parts of the support arms remaining within the air flow path will create a relatively small surface for air resistance. By providing an aerodynamic shape for the parts, a further reduction of air resistance may be obtained. After release of the load, the support arms are fully retracted into the housing 5 which is arranged to be flush with the outer covering or skin of the aircraft. For this purpose, the support arms 1a, 1b may be moved in the same direction as initially occurs during tightening of the suspended external load 9.

In accordance with FIG. 3, an embodiment is shown wherein the support arms 1a, 1b are not fastened to the nut 2 but are instead fastened in an articulated manner to a carrier member 13 which is formed separately from the nut 2. The carrier member 13 may, for example be a sleeve which can be moved or the spindle 3 by means of the lifting device 6. A spring 18 is arranged between the carrier member 13 and the nut 2. As a result of this relatively simple arrangement, in a device which may for example be manually operated on the ground, automatic retraction of the support arms 1a, 1b into the housing 5 is effected after the load 9 has been released during flight. For suspension of the outside load 9, the support arms 1a, 1b are pulled out of the housing 5 against the force of the spring 18 so that after the external load has been released, i.e. after cessation of the reaction force of the load 9 on the support arms 1a, 1b, the tensioned spring 18 automatically moves the sleeve 13 together with the support arms 1a, 1b into the housing 5.

In all of these cases, turning of the support arms 1a, 1b may be prevented by appropriate design of the housing 5 such as, for example, by providing guide members 15, 16.

In an individual case, the direction of the tightening movement may also be reversed and, for example, the support arms 1a, 1b may be actuated in a direction opposite to the direction of retraction into the housing 5. This may prove useful, for example, in the case of loads having very small diameters with relation to the spread of the support arms 1a, 1b. Also, such an arrangement may be useful in the case of loads having a plane surface which must only be fastened against a vertical application.

While specific embodiments of the invention have been shown and described in detail to illustrate the application of the inventive principles, it will be understood that the invention may be embodied otherwise without departing from such principles.

I claim:

1. A fastening device for externally coupling suspended loads on aircraft comprising a pair of support arms, a lifting device arranged between said support arms and having said support arms fastened thereto in an articulated manner, and abutment means rigidly connected with said aircraft, said support arms being arranged to be actuated by said lifting device to be drawn thereby for abutment against said abutment means and to be clamped against an external load by the action of said lifting device drawing said arms against said abutment means.

2. A device according to claim 1 wherein said lifting device consists of a spindle and a nut operatively engaged therewith.

3. A fastening device for externally coupling suspended loads on aircraft comprising a pair of support arms, a lifting device arranged between said support arms and having said support arms fastened thereto in an articulated manner, abutment means rigidly connected with said aircraft, said support arms being arranged to be actuated by said lifting device for abutment against said abutment means and to be clamped against an external load, and a housing within which said support arms are retracted by further actuation of said lifting device after release of said external load.

4. A device according to claim 1 comprising a housing within which said support arms are retracted by further actuation of said lifting device after release of said external load.

5. A device according to claim 2 or 3 wherein said lifting device includes a carrier member having said support arms fastened thereto in an articulated manner, said device further including spring means for urging said carrier member into said housing after said external load has been released.

6. A device according to claims 4 or 3 wherein said abutment means are defined as part of said housing.

7. A device according to claims 1 or 3 comprising hydraulic means for actuating said lifting device.

8. A device according to claims 1 or 3 comprising pneumatic means for actuating said lifting device.

9. A fastening device for externally coupling suspended loads on aircraft comprising a pair of support arms, a lifting device arranged between said support arms and having said support arms fastened thereto in an articulated manner, and abutment means rigidly connected with said aircraft, said support arms being arranged to be actuated by said lifting device for abutment against said abutment means and to be clamped against an external load, said lifting device consisting of a spindle and a nut operatively engaged therewith.

10. A device according to claim 9 including a worm drive mechanism for rotating said spindle.

* * * * *